UNITED STATES PATENT OFFICE.

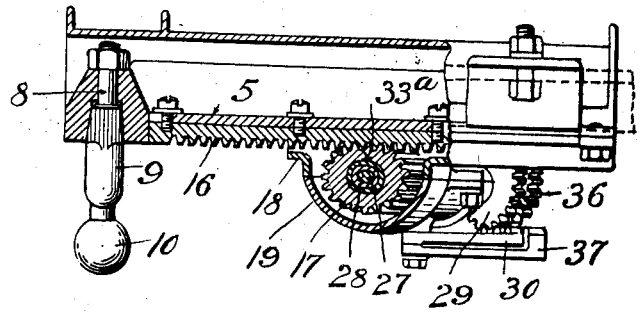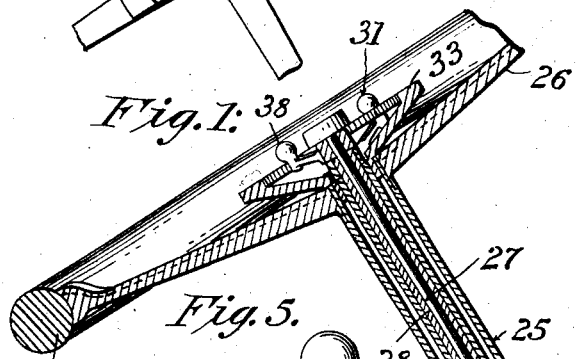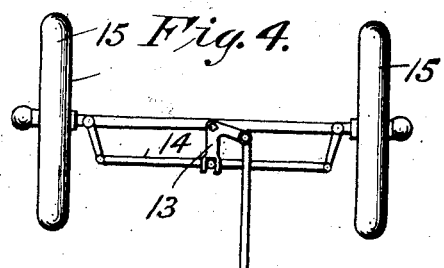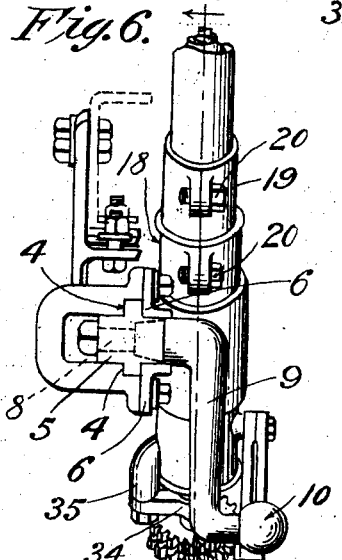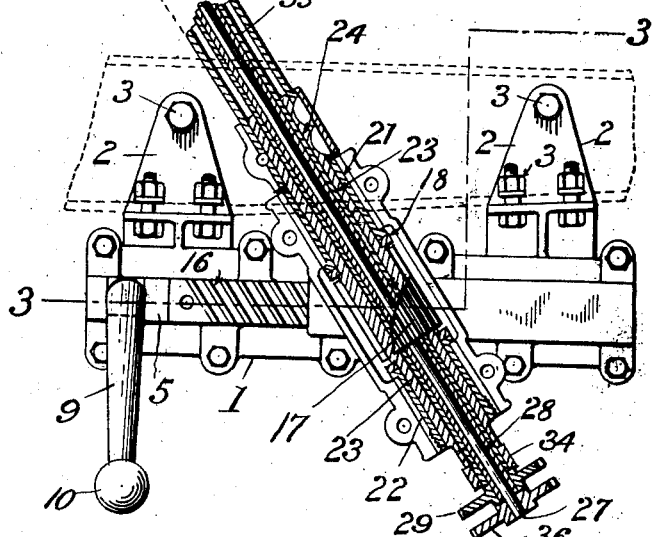

FRED A. LAW, OF HARTFORD, CONNECTICUT.

STEERING DEVICE.

No. 832,798.  Specification of Letters Patent.  Patented Oct. 9, 1906.

Application filed October 23, 1905. Serial No. 283,989.

*To all whom it may concern:*

Be it known that I, FRED A. LAW, a citizen of the United States of America, residing at Hartford, in the county of Hartford and State of Connecticut, have invented new and useful Improvements in Steering Devices, of which the following is a specification.

This invention relates to steering devices for self-propelled vehicles, and has special reference to an improved construction of steering device embodying simple and practical means for quickly transmitting the movement of the steersman's wheel to the steering-wheels of the vehicle. Also the invention has in view an improved structural arrangement of parts which insures great compactness and durability and involves a novel manner of assembling the steering-post and the two controlling-shafts, respectively, for the sparker and carbureter-valve.

With these and other objects in view, which will more fully appear as the nature of the invention is better understood, the same consists in the novel construction, combination, and arrangement of parts, which will be hereinafter more fully described, illustrated, and claimed.

In the accompanying drawings, Figure 1 is a sectional elevation of a complete steering device embodying the present invention. Fig. 2 is a top plan view showing the controller-handles and the locking-segment. Fig. 3 is a sectional view on the line 3 3 of Fig. 1. Fig. 4 is a diagram showing the steering connections between the steering-slide and the steering-wheels of the vehicle. Fig. 5 is a detail sectional view showing the locking device for one of the controller-handles. Fig. 6 is a fragmentary end view of the steering device.

Like references designate corresponding parts in the several figures of the drawings.

In carrying out the present invention the various working elements of the device are supported and maintained in operative relation through the employment of a main supporting-base. This main supporting-base is designated in its entirety by the numeral 1 and consists of a casting or forging of suitable size and strength to provide for not only the rigid support of the stationary members of the steering device, but also providing means for guiding and holding one of the members which directly connects with the steering connections for the steering-wheels of the vehicle. This main supporting-base 1 is provided at the upper side thereof with a plurality of upstanding hanger-brackets 2, carrying suitably-arranged fastening-bolts 3, which provide means for a rigid attachment of the hanger-brackets to a bolster, beam, brace, or other rigid part of the running-gear of the vehicle. The said upstanding hanger-brackets therefore provide for rigidly suspending the main supporting-base from a rigid part of the running-gear, and said base in its preferable construction is essentially in the form of an open boxing provided at its open side with longitudinal rabbets or grooves 4, constituting a guideway for slidably receiving therein a reciprocatory steering-slide 5. The steering-slide 5 is properly retained in its guideway by means of flanged retaining-plates 6, bolted or otherwise detachably secured to one side of the base above and below the slide. Also the supporting-base has detachably fitted over the open side thereof which receives the steering-slide a cover-plate which acts as a housing to partly or entirely cover the slide.

The reciprocatory steering-slide 5 receives at one end thereof a fastening-bolt 8 for rigidly securing thereto one end of a fixed crank-arm 9, the other end of which arm preferably carries a joint-ball 10, having the socket connection 11 at one end of the connecting-rod 12, the other end of which rod is coupled to a transmitting bell-crank 13, having operative connection with the cross-bar 14, which couples or links together the steering-knuckles of the opposite steering-wheels 15 of a self-propelled or similar vehicle.

The parts described constitute the steering connections between the wheels and the steering-slide of the steering device, and it will be understood that any operative connections for this purpose may be employed without departing from the scope of the present invention.

The reciprocatory steering-slide carries a longitudinally-arranged adjusting-rack 16. This rack may be cast integrally with the slide-body or separately fastened thereto, as shown in the drawings, in either event constituting a rigid part of the slide, so that when motion is communicated to the rack the slide moves therewith and effects the movement or actuation of the steering connection with the wheel.

In order to accommodate the usual inclined positions of the parts of the steering device within reach of the steersman, the rack of the steering-slide is of the miter type that is formed with teeth set obliquely and designed to mesh with the spurs or radial teeth of an obliquely-supported actuating-pinion 17, which is arranged within an inclined bearing-box 18, carried and supported by the main supporting-base 1. The said inclined bearing-box is set obliquely or at an inclination and is arranged at the side of the supporting-base which receives and guides the steering-slide, and the said bearing-box is cast integrally or otherwise rigidly connected with the main supporting-base, so as to constitute a part of the main support or base of the steering device; but to permit of the assembling of the parts the boxing 18 is provided at its outer side with a detachable cap member 19, bolted, as at 20, or otherwise detachably fastened to the fast part or member of the boxing.

The bearing-box 18 is necessarily open at the side next to the rack 16 to provide for the intermeshing of said rack and the actuating-pinion therefor, and in connection with the mounting of the various parts associated with the bearing-box the latter is provided at the upper and lower ends thereof above and below the plane of the pinion with the contracted terminal bearing-collars 21 and 22, respectively, which bearing-collars are fitted with babbitted or other suitable bearing-sleeves or bearing members to provide wide bearing-points for the bearing-support of the actuating-pinion. In this connection it will be observed that the said actuating-pinion 17 is of a tubular construction and is provided at the ends thereof with extended journal-sleeves 23, which extend through and turn in the terminal collars 21 of the bearing-box 18.

The upper journal member of the actuating-pinion 17 projects above the bearing-box 18 and has a coupling-collar connection 24 with the lower end of the inclined tubular steering-post 25, which extends in proximity to the steersman's seat and has fitted to the upper end thereof the usual hand-wheel 26, which constitutes the steering-wheel.

Inside of the tubular steering-post 25 and also inside of the actuating-pinion 17 and its journal-sleeves 23 are arranged engine-controlling shafts 27 and 28, respectively. The shaft 28 consists of a tube carrying at its lower end below the bearing-box 18 a gear-wheel 29, meshing with a rocking rack or equivalent element 30, having suitable operative connection with the carbureter-valve of the engine for controlling the fuel-supply. The upper end of the tubular shaft 28 has attached thereto a swinging controller-handle 31, carrying a latch 32, engaging the outer teeth of a stationary locking-segment 33. This locking-segment is provided with outer and inner teeth and is made fast to the upper end of a stationary supporting-tube 33ª, extending longitudinally through the steering-post and pinion and connected at its lower end to a holding-collar 34, carried by a bracket element 35 on the fast part of the bearing-box 18.

The other controlling-shaft 27 consists of a rod turning inside of the tube 28 and carrying at its lower end a gear-wheel 36, meshing with the rocking rack or equivalent device 37, operatively connected with the sparker control of the engine. The rod or shaft carries at its upper end a controller-handle 38, having a latch which coöperates with the inner teeth of the segment 33.

From the foregoing it is thought that the construction, operation, and practical advantages of the herein-described steering device will be readily apparent without further description, and it will be understood that changes in the form, proportion, and minor details of construction may be resorted to without departing from the spirit or sacrificing any of the advantages of the invention.

Having thus described my invention, what is claimed, and desired to be secured by Letters Patent, is—

1. In a steering device, a supporting-base, a steering-slide mounted on the base and provided with a rack, steering-wheel connections with said rack, a bearing-box arranged on the base, a tubular pinion meshing with the rack, a tubular steering-post connected with said pinion and carrying the steering-wheel, and separate concentrically-arranged controlling-shafts extending through the pinion and steering-post and carrying at their upper ends controller-handles, said separate shafts being provided at their lower ends with motion-transmitting connections for the carbureter-valve and sparker of the vehicle-motor.

2. In a steering device, a supporting-base having a guideway, a reciprocatory steering-slide working in the guideway and provided with a rack, steering-wheel connections with the slide, a bearing-box carried by the base and provided with upper and lower terminal bearing-collars, a tubular pinion having extended journal-sleeves turning in said collars, a tubular steering-post connected with one of said journal-sleeves and carrying the steering-wheel, a stationary supporting-tube extending through the steering-post and pinion and carrying at its upper end a locking-segment, separate concentrically-arranged controlling-shafts located within said stationary tube and carrying at their upper ends controller-handles coöperating with said segment, said shafts being provided at their lower ends with motion-transmitting connections for the carbureter-valve and sparker for the vehicle-motor.

FRED A. LAW.

Witnesses:
 H. A. CHAPIN,
 K. I. CLEMONS.